United States Patent
George

(10) Patent No.: US 11,782,260 B2
(45) Date of Patent: Oct. 10, 2023

(54) TRANSMISSIVE OPTICAL DELAY SYSTEM AND METHOD

(71) Applicant: Battelle Memorial Institute, Columbus, OH (US)

(72) Inventor: Anthony George, Columbus, OH (US)

(73) Assignee: BATTELLE MEMORIAL INSTITUTE, Columbus, OH (US)

(*) Notice: Subject to any disclaimer, the term of this patent is extended or adjusted under 35 U.S.C. 154(b) by 0 days.

(21) Appl. No.: 17/214,091

(22) Filed: Mar. 26, 2021

(65) Prior Publication Data

US 2021/0302716 A1   Sep. 30, 2021

Related U.S. Application Data

(60) Provisional application No. 63/000,898, filed on Mar. 27, 2020.

(51) Int. Cl.
*G02B 26/00* (2006.01)
*G01J 3/453* (2006.01)

(52) U.S. Cl.
CPC ............ *G02B 26/001* (2013.01); *G01J 3/453* (2013.01)

(58) Field of Classification Search
CPC . G01B 2290/35; G01B 2290/40; G01J 3/453; G01J 3/4537; G01J 9/02; G01J 2009/0223; G01J 2009/0292; G01J 2009/0296; G02B 26/001
See application file for complete search history.

(56) References Cited

U.S. PATENT DOCUMENTS

| | | | | |
|---|---|---|---|---|
| 5,283,796 A | * | 2/1994 | Fink | H01S 3/105 372/98 |
| 9,696,136 B2 | * | 7/2017 | Wang | G02B 26/06 |
| 2006/0072424 A1 | * | 4/2006 | Everett | G01B 9/02069 369/44.11 |
| 2014/0192365 A1 | * | 7/2014 | Mortada | G01B 9/02091 356/521 |

FOREIGN PATENT DOCUMENTS

| | | | | | |
|---|---|---|---|---|---|
| EP | | 468816 A | * | 1/1992 | ............ G01J 3/4532 |
| EP | | 3521784 A1 | * | 8/2019 | ............ G01J 3/4532 |

* cited by examiner

*Primary Examiner* — Michael A Lyons
(74) *Attorney, Agent, or Firm* — Volpe Koenig

(57) ABSTRACT

The disclosed discrete or continuous optical delay is a medium with high transmission, a high index of refraction and a low dispersion coefficient at the wavelength of light of interest. One side of the medium, orthogonal to the incident light, is fabricated to delay the light at discrete values in a periodic pattern that repeats as the optical delay rotates. The disclosed discrete or continuous optical delay enables the creation of compact interferometry equipment to be used outside a laboratory environment.

20 Claims, 10 Drawing Sheets

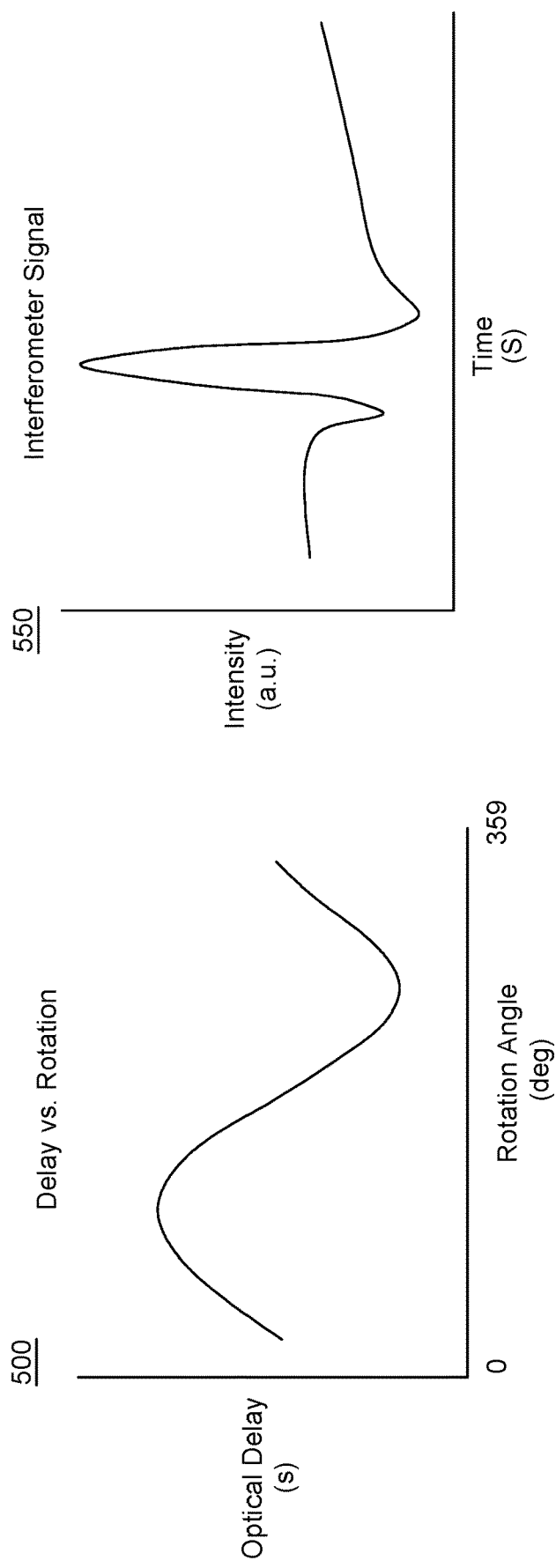
FIG. 5B
FIG. 5A
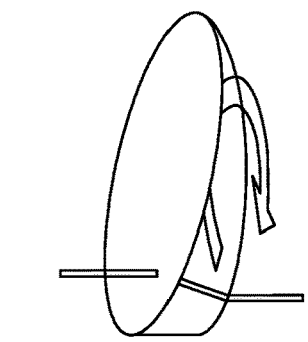
FIG. 5C

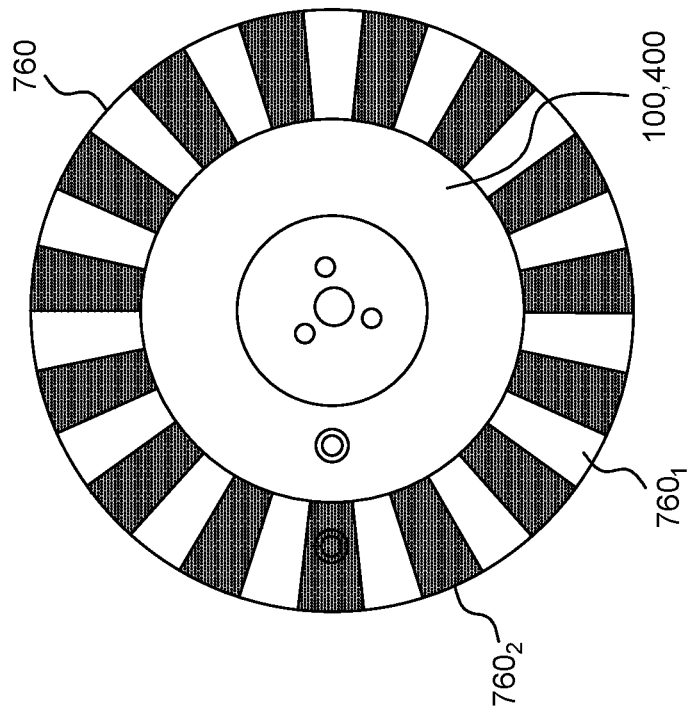
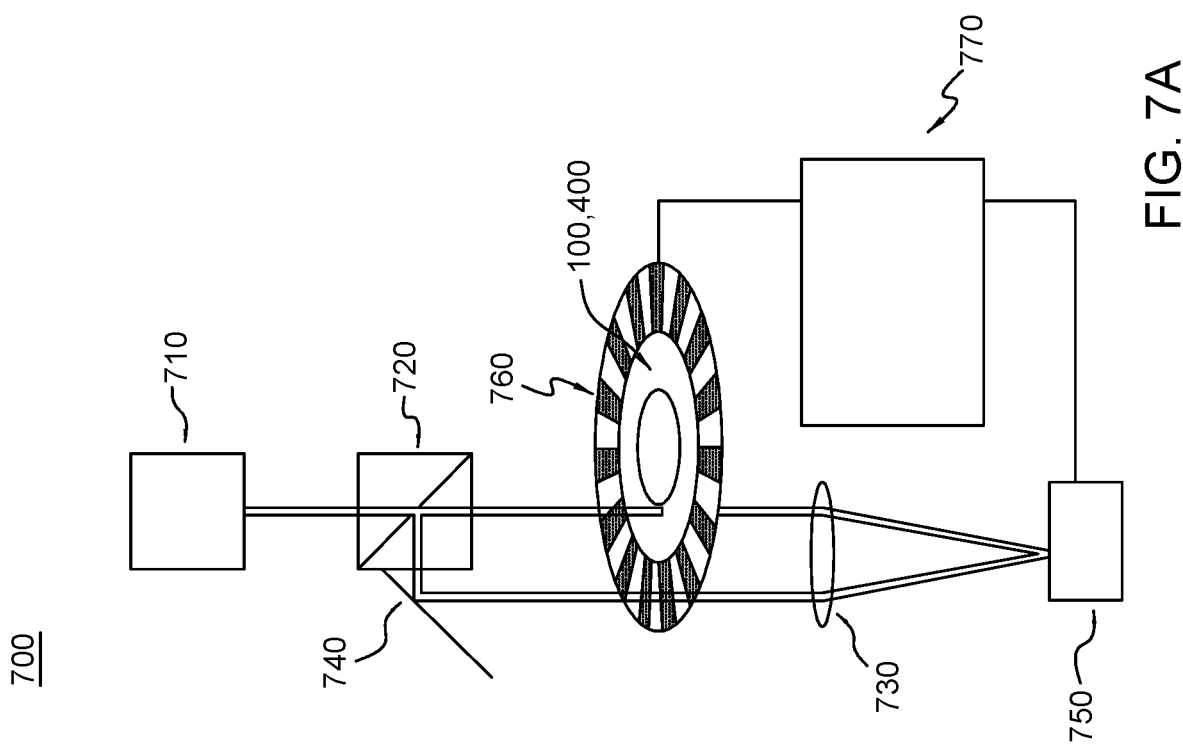
FIG. 7B
FIG. 7A

TRANSMISSIVE OPTICAL DELAY SYSTEM AND METHOD

CROSS REFERENCE TO RELATED APPLICATIONS

This application claims the benefit of U.S. provisional application No. 63/000,898, filed Mar. 27, 2020, which is incorporated by reference as if fully set forth.

FIELD OF INVENTION

The present invention is related to a transmission optical delay system and method, and more particularly, to a transmission optical delay system and method for time-domain interferometry.

BACKGROUND

Time-domain spectroscopy is a type of spectroscopy that measures the power of electromagnetic radiation as a function of time. Normal spectroscopy is frequency-domain spectroscopy that measures radiation as a function of frequency or wavelength. Time-domain spectroscopy usually requires the use of Fourier transforms.

Generally, in time-domain spectroscopy, two monochromatic light sources of different frequencies are combined to produce interference patterns. At time t=0, the waves may interfere constructively providing a maximum in an added plot. As time continues, the waves may become more out of phase leading to destructive interference and a minimum in the added plot. From one peak maximum to the next is a cycle. Broad peaks in spectra are made of many wavelengths.

Absorptions in spectra usually look like broad peaks. This means that a peak may contain many wavelengths of radiation. These wavelengths can be plotted in the time domain producing smaller areas of constructive interference. This constructive interference is because the closely spaced wavelengths quickly become more and more out of phase.

Spectroscopy done with visible or infrared radiation involves wavelengths around 1000 Hz (1 KHz). Detectors are limited in collecting measurements with that timing. Therefore, in order to reduce the frequency of the signals, a Michelson interferometer may be used. Generally, monochromatic light traveling through a Michelson interferometer is split into two beams by a beam splitter. These beams travel to mirrors, reflect, and then recombine at the beam splitter. One of the mirrors may be adjusted. When the two mirrors are the same distance apart, the light from each mirror interacts at the beam splitter in-phase to produce constructive interference. As the one mirror is shifted, the beams may be out of phase. When the movable mirror has moved a distance equal to one-quarter of the wavelength of light, the extra distance the light reflecting from that movable mirror travels is one-half the wavelength of light causing the two beams to combine at the beam splitter producing destructive interference. Shifting the mirror a total distance of one-half the wavelength of light causes the spectra to complete one cycle. A plot of the power of radiation as a function of distance traveled by the movable mirror may be provided and, with knowledge of the speed of the movable mirror, the power of radiation may be plotted as a function of time.

However, moving a mirror to create the distance of ½ the wavelength of light can cause complications in alignment and precision of movement within the system.

SUMMARY

A coherent light source passes through a transparent medium which is fabricated such that, when rotated about an axis parallel to the light source, the time of flight of the transmitted light is delayed by discrete values, determined by the profile of the rotating medium, due to the difference in refractive index between the transparent medium and air. In time-domain interferometry experiments, two coherent optical signals are superimposed spatially and temporally, and modulated by a sample somewhere in the optical path to resolve small features on the sample. The measured superposition is resolved in time by modulating the length of one optical signal in space using an optical delay line. Typical optical delay lines include two mirror pairs, one stationary and one that moves away from the first, lengthening the optical path length. These delay lines are large, slow and introduce unwanted variance in the measured superposition as the movement occurs. The disclosed optical delay modulates the optical path length by passing the light through a refractive medium and modulating the length of the material in a periodic pattern. This type of optical delay is smaller, faster and introduces less variation than traditional optical delay lines.

The disclosed discrete or continuous optical delay is a medium with high transmission, a high index of refraction and a low dispersion coefficient at the wavelength of light of interest. One side of the medium, orthogonal to the incident light, is fabricated to delay the light at discrete values in a periodic pattern that repeats as the optical delay rotates. The disclosed discrete or continuous optical delay enables the creation of compact interferometry equipment to be used outside a laboratory environment.

A device, system and method are disclosed. The device is designed to impart a varying optical delay into an optical system based on rotation. The device includes a first surface configured to be aligned substantially perpendicular to a light beam in use, the first surface having a first surface center and a second surface angularly offset with the first surface by an angle, $\phi$, the second surface having a second surface center concentric with the first surface center and defining a center of the device. The device is configured to accept a light beam outside the center of the device, and is configured to rotate in a rotation angle, $\Theta$, about the center to create a varying optical delay in a light beam where the optical delay is defined by the rotation angle $\theta$ and angular offset $\phi$. The device comprises an index of refraction greater than 1. The device comprises a transmission of approximately 1. The device may be continuous in forming the angular offset $\phi$. Alternatively, the device may be segmented in forming the angular offset $\phi$ with the number of segments within a range from 4-12 segments. The angular offset $\phi$ may be between 5-50 degrees, and more particularly between 20-40 degrees, and more particularly 35-40 degrees. The device may be formed from at least one of N-BK7, UV fused silica, calcium fluoride, magnesium fluoride, zinc selenide, sapphire, barium fluoride, silicon, and germanium. The optical delay created is a function of the thickness of the device interacting with the beam.

The system utilizing an optical delay including the device may further include a light source, a beamsplitter to split the light source into two light beams and an accumulator optic designed to direct the two light beams onto a detector. The system may further include an optic designed to capture the delayed light beam as the light beam shifts as a result of the angle $\phi$ causing the beam to refract. The system may further include at least one aligning mirror to maintain alignment of the two light beams. The optical delay in the system is a function of the thickness of the device interacting with the beam. The light source may be coherent and may be infrared, such as centered at 785 nm or 815 nm.

The method for performing optical delay using an optic includes providing a coherent light beam from a light source, splitting the beam to provide dual light beams, interacting with one of the dual light beams using the optic that provides a varying optical delay based on the rotation angle of the optic, and converging the dual beams onto a detector to measure an interferometric signal in intensity based on rotation of the optic imparting vary optical delay.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 5A illustrates a plot of the optical delay plotted against the rotation angle for the optic of FIG. 4A;

FIG. 5B illustrates a plot of the intensity plotted against time for the interferometer signal using the optic of FIG. 4A;

FIG. 5C illustrates a depiction of the optic of FIGS. 4A, 4B illustrating the continuous sample points created by the smooth optic;

FIG. 7A illustrates a system utilizing the delay provided by the optic of FIG. 1A or optic of FIGS. 4A, 4B combined with an optical chopper rotated synchronously with the optic;

FIG. 7B illustrates a view of the optic/chopper element used in the system of FIG. 7A.

DETAILED DESCRIPTION

A coherent light source passes through a transparent medium which is fabricated such that, when rotated about an axis parallel to the light source, the time of flight of the transmitted light is delayed by discrete values, determined by the profile of the rotating medium, due to the difference in refractive index between the transparent medium and air. In time-domain interferometry, two coherent optical signals are superimposed spatially and temporally, and modulated by a sample somewhere in the optical path to resolve small features on the sample. The measured superposition is resolved in time by modulating the length of one optical signal in space using an optical delay line. Typical optical delay lines include two mirror pairs, one stationary and one that moves away from the first, lengthening the optical path length. These typical optical delay lines are large, slow and introduce unwanted variance in the measured superposition as the mirror moves. The disclosed optical delay modulates the optical path length by passing the light through a refractive medium and modulating the length of the material in a periodic pattern. This disclosed optical delay is smaller, faster and introduces less variation than traditional optical delay lines.

The disclosed discrete or continuous optical delay is a medium with high transmission, a high index of refraction and a low dispersion coefficient at the wavelength of light of interest. One side of the medium, orthogonal to the incident light, is fabricated to delay the light at discrete values in a periodic pattern that repeats as the optical delay rotates. The disclosed discrete or continuous optical delay enables the creation of compact interferometry equipment that can be used outside a laboratory environment.

Figure 1:
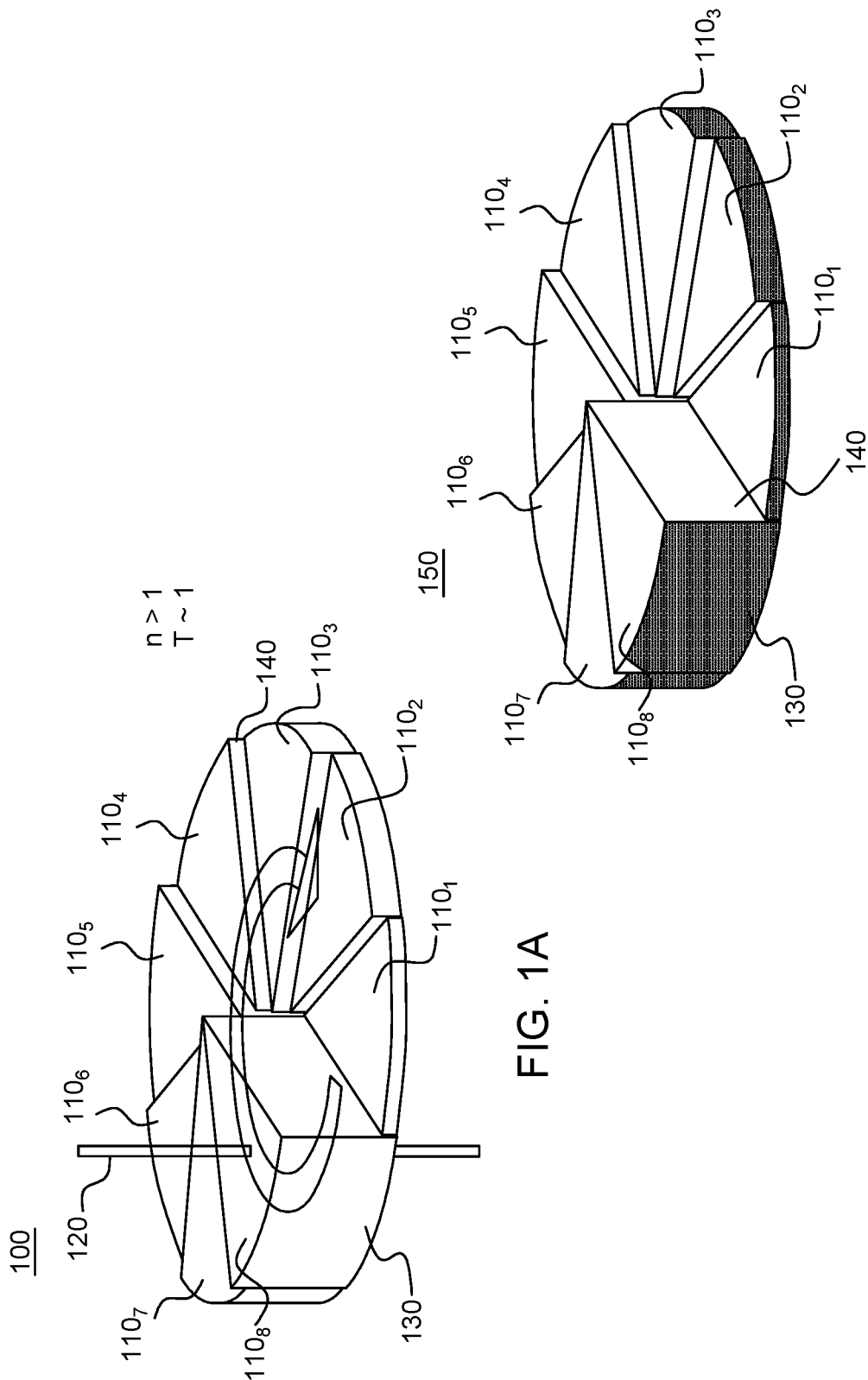
FIG. 1A illustrates a three-dimensional depiction of an optic designed to create an optical delay in the transmission of a light source.
FIG. 1B illustrates an isometric view of the optic of FIG. 1A allowing illustration of the surfaces of the optic.

FIG. 1A illustrates a three-dimensional depiction of an optic 100 designed to create an optical delay in the transmission of a light source. Optic 100 is illustrated with eight segments $110_1$, $110_2$, $110_3$, $110_4$, $110_5$, $110_6$, $110_7$, $110_8$ (collectively referred to as segments 110) and a back surface 130. In the exemplary eight segment 110 optic 100, each segment 110 includes a 45-degree wedge of the optic. While optic 100 is illustrated with eight segments 110, other numbers of segments may be utilized, including 2, 4, 6, 10, 12, 16, 24, and 32, as would be understood by those possessing an ordinary skill in the art. That is, the use of eight segments is for illustration purposes only with an understanding that any number of segments may be used in the present system.

Each of segments 110 may define a plane at a different distance from back surface 130. As illustrated, segments 110 may have increasing distance between the defined plane of segment 110 and back surface 130. A plurality of walls 140 defined between the transmissions of segments 110 may be substantially vertical. The vertical aspect of walls 140 may be defined so the walls 140 fail to interact, or minimally interact, with the light propagating from a light source 120. As would be understood, the number of walls 140 is defined by the number of segments 110 used. Therefore, the number of walls 140 may vary from that illustrated in FIG. 1A. In the exemplary eight segment 110 illustration, eight walls 140 exist.

The material of optic 100 may have a refractive index larger than 1 (n>1) and high transmission (T~1) of the light propagating from the light source 120. By way of example, optic 100 may be fabricated from N-BK7, UV fused silica, calcium fluoride, magnesium fluoride, zinc selenide, sapphire, barium fluoride, silicon, and germanium. Optic 100 may include a wavelength-specific anti-reflection (AR) coating (not shown) centered around the wavelength of the light propagating from light source 120, or in the configuration where light source 120 is a broader spectrum light source, a center wavelength. Such a coating may be included on back surface 130 and/or on front segments 110, and even on the walls 140 if a benefit can be provided from such a coating.

FIG. 1B illustrates an isometric view 150 of the optic 100 of FIG. 1A allowing illustration of the surfaces of the optic. View 150 is provided to illustrate additional detail of optic 100 not visible or obscured in FIG. 1A. Optic 100 is illustrated with eight segments $110_1$, $110_2$, $110_3$, $110_4$, $110_5$, $110_6$, $110_7$, $110_8$ (collectively referred to as segments 110) and a back surface 130. As illustrated, segments 110 may have increasing distance between the defined plane of segment 110 and back surface 130. A plurality of walls 140 defined between the transmissions of segments 110 may be substantially vertical.

Optic 100 may be designed to provide a transmissive optical delay of the light propagating from light source 120. Using the exemplary eight segments, optic 100 may delay the light propagating from the light source 120 (which generally in operation may be a coherent light source) by discrete values defined by the segments 110 as optic 100 rotates. By rotating optic 100, each of the segments 110 may be placed to interact with the light propagating from light source 120 for a period of time defined by the speed of rotation of optic 100. As the thickness of optic 100 varies based on the segment 110 interacting with the light propagating from the light source 120, the optical delay may vary as the optic is rotated.

Figure 2:
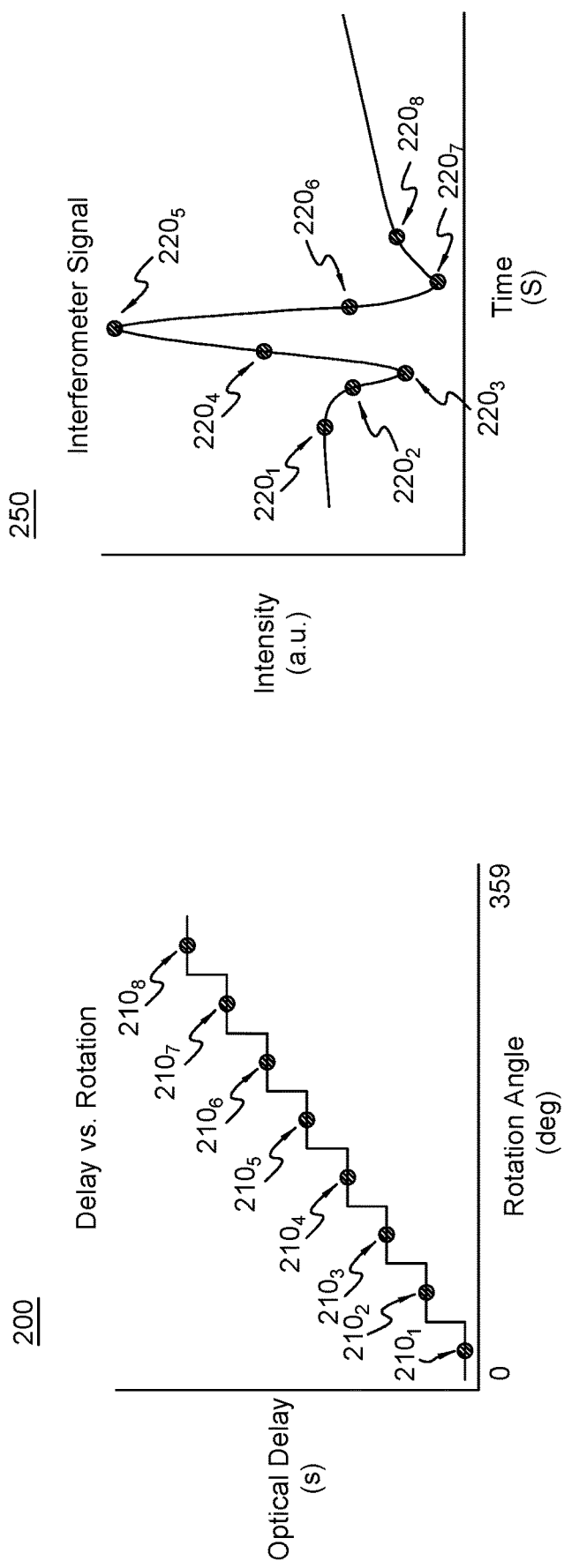
FIG. 2A illustrates a plot of the optical delay plotted against the rotation angle for the optic of FIG. 1A.
FIG. 2B illustrates a plot of the intensity plotted against time for the interferometer signal using the optic of FIG. 1A.
FIG. 2C illustrates a depiction of the optic of FIG. 1A illustrating the eight sample points of the discrete optic.

FIG. 2A illustrates a plot 200 of the optical delay plotted against the rotation angle for the optic 100 of FIG. 1A. The optical delay is defined in seconds (s). The rotation angle of optic 100 is defined in degrees with zero degrees at the transition from the thickest segment $110_8$ and thinnest segment 1101. The optical delay associated with a given segment 110 is provided in the plot of optical delay, collectively referred to as optical delay 210, with like subscript. Segment 1101 provides an optical delay 2101, segment 1102 provides an optical delay 2102, segment $110_3$ provides an optical delay $210_3$, segment 1104 provides an optical delay 2104, segment $110_5$ provides an optical delay $210_5$, segment $110_6$ provides an optical delay $210_6$, segment $110_7$ provides an optical delay $210_7$, and segment $110_8$ provides an optical delay $210_8$.

As may be seen in plot 200, matching each of the segments 110 is a flattened optical delay 210 associated with each of the respective segments 110. The exemplary discrete transmission optical delay 210 includes 8 steps matching the 8 segments 110. As illustrated in the plot 200, once the rotation of optic 100 reaches the next segment 110, a new optical delay 210 is achieved. This piecewise stepping continues for each of the segments 110 of optic 100.

FIG. 2B illustrates a plot 250 of the intensity plotted against time for the interferometer signal using the optic 100 of FIG. 1A. Plot 250 illustrates the sampled time-domain interferometry signal, where the 8 dots represent discrete values 220 of the signal corresponding to the segments 110 at discrete times. The curve in plot 250 is represented as a spline to show how the signal may be interpolated in post-processing. More specifically, segment 1101 provides an optical delay 2101 that results in intensity 2201, segment 1102 provides an optical delay 2102 that results in intensity 2202, segment $110_3$ provides an optical delay $210_3$ that results in intensity $220_3$, segment 1104 provides an optical delay 2104 that results in intensity 2204, segment $110_5$ provides an optical delay $210_5$ that results in intensity $220_5$, segment $110_6$ provides an optical delay $210_6$ that results in intensity $220_6$, segment $110_7$ provides an optical delay $210_7$ that results in intensity $220_7$, and segment $110_8$ provides an optical delay $210_8$ that results in intensity $220_8$.

Based on the parallel aspect of the segments 110 and the back surface 130, the beam may experience negligible deviation (likely caused only by reflection, refraction) in beam propagating through optic 100. However, any notable deviations in the light source 120 may be accounted for, as would be understood by those possessing an ordinary skill in the art. Such methods to account for deviations may include wave plates and beamsplitters and other optics generally used to correct the beam angle. One method to account for the deviations may include imparting a slight wedge in optic 100 to shift the beam propagation as needed. A ray trace is provided for the continuous optic described below to further the understanding of light collection and sensing.

FIG. 2C illustrates a depiction of the optic 100 of FIG. 1A illustrating the eight sample points of the discrete optic as discussed with respect to FIG. 1A.

Figure 3:
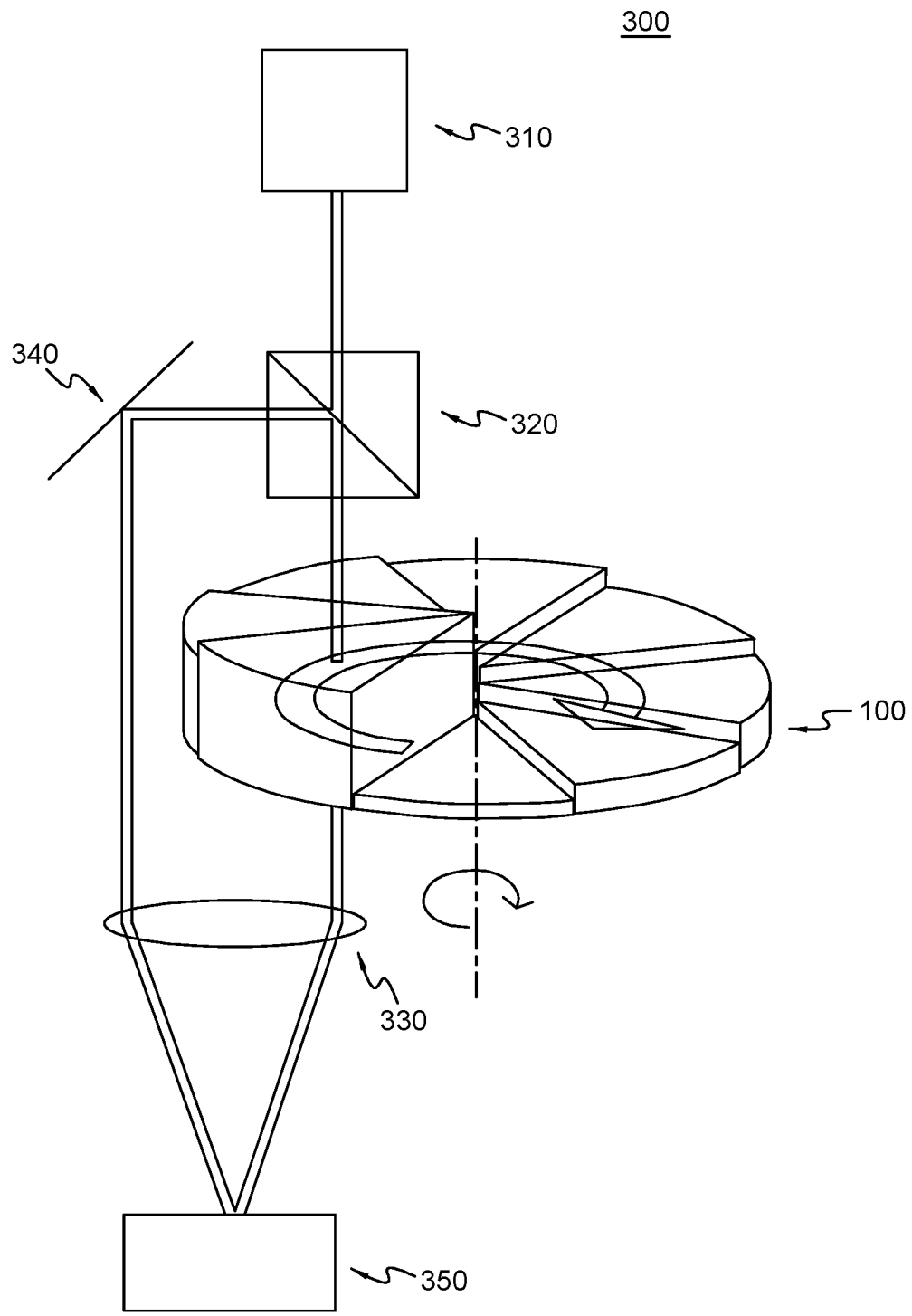
FIG. 3 illustrates a system utilizing the discrete delay provided by the optic of FIG. 1A.

FIG. 3 illustrates a system 300 utilizing the discrete delay provided by the optic of FIG. 1A. System 300 provides an example application of the discrete transmission optical delay. A single coherent light source 310 is split into two coherent beams via beamsplitter 320. One beam is focused through a lens 330 using a right-angle mirror 340 (to enable alignment) onto a detector 350. The other beam is first passed through the optic 100 providing the transmission optical delay and then focused through lens 330 onto a detector 350. Both beams may transmit through the lens 330 at the same point and may be incident on detector 350 also at the same location. The superposition of the two beams are spatially (and therefore temporally) convolved as the transmission optical delay rotates. A ray trace is provided for the continuous optic described below to further the understanding of light collection and sensing. Similar techniques may be used in system 300 for optic 100.

The definition of optical delay is generalized as follows:

$$\tau_{delay} = z(\theta)\frac{1}{c}\frac{n_m}{n_0},$$

where $\tau_{delay}$ is the optical delay in seconds, z is the thickness of optic 100 (medium) traveled by the light from light source 310 in meters, θ is the angle of rotation of optic 100 in radians, c is the speed of light in meters per second, $n_m$ is the refractive index of optic 100 (medium), which is unitless, and $n_0$ is the refractive index outside optic 100 (medium), which is also unitless.

For example, if the optic 100 is formed of fused silica optic 100 having an optical thickness z=0.03 meters (3 cm) may have $n_m$=1.5 and where the system is operating in the air at sea level $n_0$=1.0. given this example, the optical delay may be reduced to:

$$\tau_{delay} = \frac{\theta}{4 \times 10^9},$$

with θ in radians.

Figure 4B:
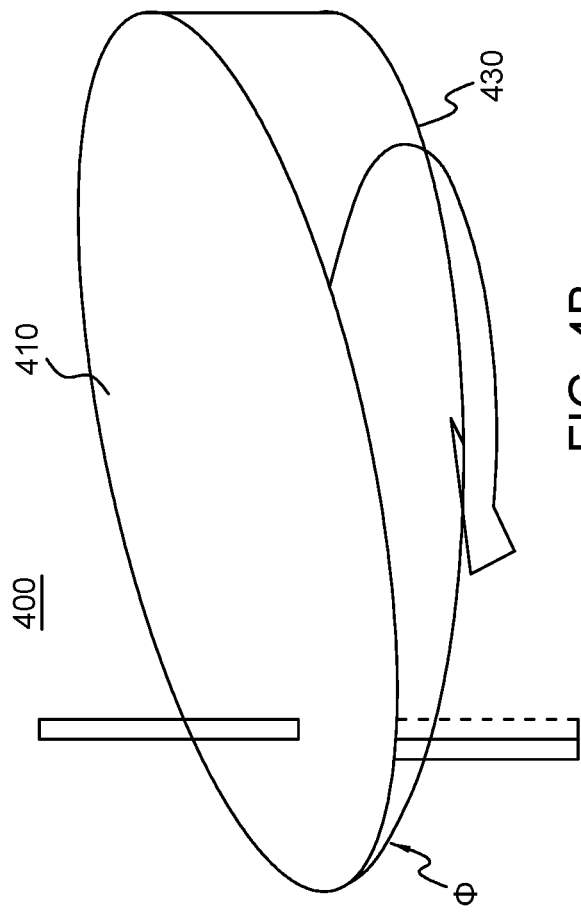
FIG. 4B illustrates a three-dimensional depiction of the optic designed to create a continuous optical delay in the transmission of a light source presented from the opposite side of FIG. 4A.
Figure 4A:
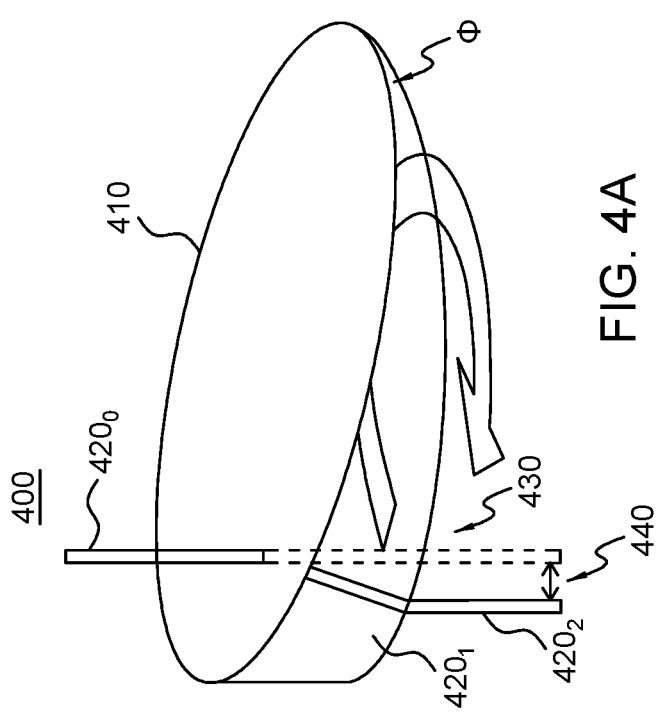
FIG. 4A illustrates a three-dimensional depiction of an optic designed to create a continuous optical delay in the transmission of a light source.

FIG. 4A illustrates a three-dimensional depiction of an optic 400 designed to create a continuous optical delay in the transmission of a light source. FIG. 4B illustrates a three-dimensional depiction of the optic 400 designed to create a continuous optical delay in the transmission of a light source shown from the opposite side as the view presented in FIG. 4A. Optic 400 provides a transmissive optical delay delaying the coherent light by continuous values as optic 400 rotates. Collectively, FIGS. 4A and 4B depict optic 400 which depictions include a back surface 430 and a front surface 410. Optic 400, instead of the having eight segments 110 of optic 100, is formed with a continuous wedge created by an angle φ between back surface 430 and front surface 410. The angle φ may be any angle from 0 to 60 or more degrees. By way of example, a 10°, 20°, 30°, 40°, or 50° wedge may be used. While the available wedge angle is described above as selecting an angle from a list in 10° increments, other values to create the list of available wedge angles may also be used. These other increments include 5° increments for angles between 0 and 60. Other angles between 0 and 60 degrees, such as angles from a list that includes increments of 1° may also be used.

When the light from light source 420 interacts with the surfaces of optic 400, such as front surface 410 and back surface 430, the light may refract. This refraction is depicted in FIG. 4A using an incident light beam $420_0$ from light source 420. After interacting with front surface 410, incident light beam $420_0$ refracts along a path defined by first refracted light beam 4201 which beam then refracts at back surface 430 along a path defined by second refracted light beam 4202. The beams, incident light beam $420_0$ and second refracted light beam 4202 may be parallel and offset by a distance 440 defined by the thickness and refractive index of the optic. Other optics in the system may be used to account for this beam displacement by distance 440.

The material of optic 400 may be similar to that of optic 100. Optic 400 may designed to have a refractive index larger than 1 (n>1) and high transmission (T~1) of the light propagating from the light source 120. By way of example, optic 400 may be fabricated from N-BK7, UV fused silica, calcium fluoride, magnesium fluoride, zinc selenide, sapphire, barium fluoride, silicon, and germanium. Optic 400, similar to optic 100, may include a wavelength-specific anti-reflection (AR) coating (not shown) centered around the wavelength of the light propagating from light source 420, or in the configuration where light source 420 is a broader spectrum light source, a center wavelength. Such a coating may be included on back surface 430 and/or on front surface 410.

Figure 4C:
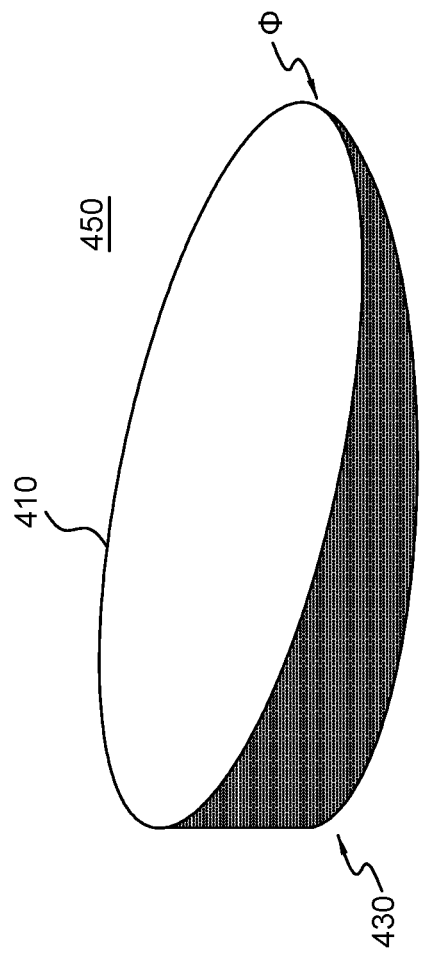
FIG. 4C illustrates an isometric view of the optic of FIGS. 4A, 4B allowing illustration of the surfaces of the optic.

FIG. 4C illustrates an isometric view 450 of the optic 400 of FIGS. 4A, 4B allowing illustration of the surfaces of the optic 400. Since the incident surface 410 of optic 400 is no longer normal to the light from light source 420, the light may refract and emerge from the back surface 430 with an offset, $r_{offset}$, which will vary proportionally to the distance traveled with in the medium. The offset, $r_{offset}$, may be defined according to the following equation:

$$r_{offset} \propto z(\Theta, \varphi, n_m),$$

where $n_m$ is the index of the optic 400. By rotating optic 400, optic 400 interacts with the light propagating from the light source 420 and the thickness of optic 400 involved in the interaction varies and is defined by the speed of rotation of optic 100. As the thickness of optic 400 involved in the interaction varies based on the thickness of optic 400 interacting with the light propagating from the light source 120, the optical delay may vary as the optic is rotated. This deviation in the light propagating from the light source 120 may be accounted for as would be understood by those possessing an ordinary skill in the art. Such methods may include wave plates and beamsplitters and other optics generally used to correct the beam angle.

Figure 4D:
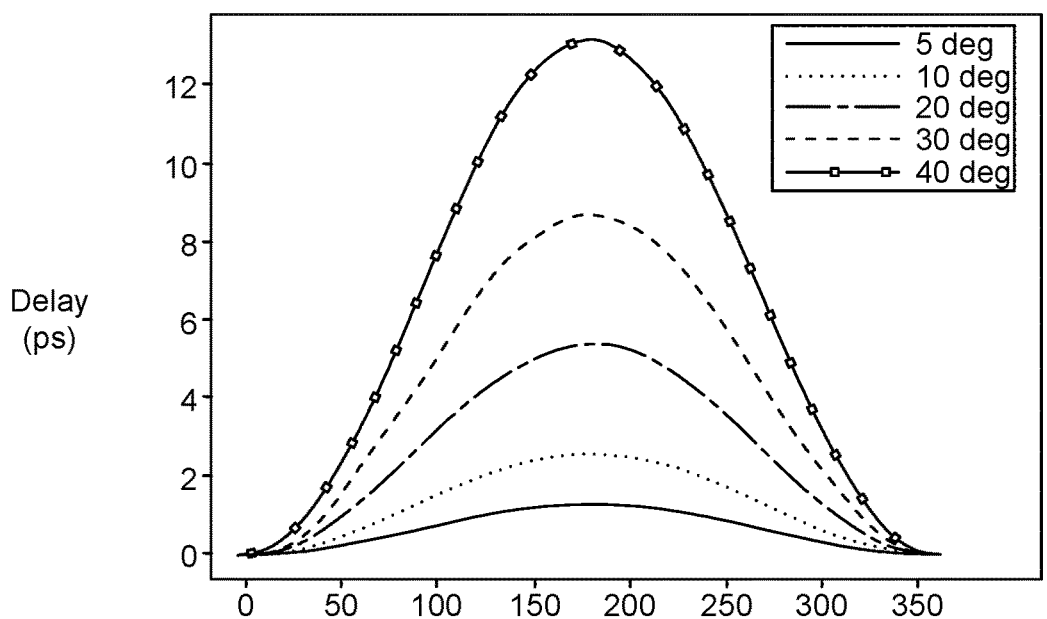
FIG. 4D illustrates a plot of the optical delay for an example material for optic as a function of angle of rotation.

FIG. 4D illustrates a plot 490 of the optical delay for an example material for optic 400 as a function of angle of rotation. This optical delay may occur in the system described in FIGS. 6A and 6B, for example. The example material is $CaF_2$ and the exemplary plot 490 is illustrated for 785 nm light. Plot 490 illustrates different angles φ of the optic 400 in the respective curves for 5 degree, 10 degrees, 20 degrees, 30 degrees, and 40 degrees wedge angles. At 40 degrees for φ, the optical delay is 0 at an angle of rotation of zero degrees, increases to approximately 13 ps at an angle of rotation of 180 degrees, and back to an optical delay of 0 at an angle of rotation of 360 degrees (fully rotated and back to the 0 degree rotation position). The peak optical delay at 30 degrees for φ is approximately 9 ps at 180 degrees, at 20 degrees for φ is approximately 5 ps at 180 degrees, at 10 degrees for φ is approximately 3 ps at 180 degree, and at 5 degrees for φ is approximately 1 ps at 180 degree.

Figure 4E:
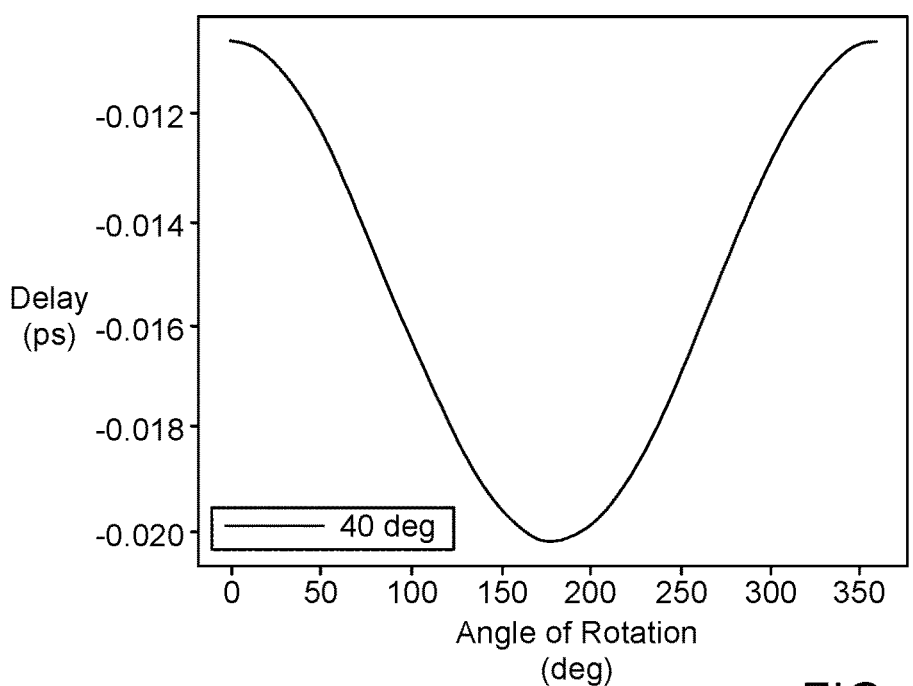
FIG. 4E illustrates a plot of the chromatic effects of the exemplary material in FIG. 4D at 815 nm light as compared to 785 nm light.

FIG. 4E illustrates a plot 495 of the chromatic effects of the exemplary material in FIG. 4D at 815 nm light as compared to 785 nm light. This optical delay and chromatic effects may occur in the system described in FIGS. 6A and 6B, for example. For an optic at 40 degrees for φ, the optical delay may be affected by the chromatic effects in a varying amount between 0.010 and 0.020 ps across a full 360-degree angle of rotation of optic 400.

FIG. 5A illustrates a plot 500 of the optical delay plotted against the rotation angle for the optic 400 of FIG. 4A. As is illustrated in plot 500 as compared to plot 200, the optical delay is continuous in plot 500. The optical delay is defined in seconds (s). The rotation angle of optic 100 is defined in degrees with zero degrees at roughly the middle thickness of optic 400. The optical delay associated with a given angle of rotation is provided in the plot of optical delay. The optical delay is sinusoidal in a continuous transmission delay.

FIG. 5B illustrates a plot 550 of the intensity plotted against time for the interferometer signal using the optic 400 of FIG. 4A. Plot 550 illustrates the sampled time-domain interferometry signal of the continuous optic 400 rotated through a complete circle. The curve in plot 550 is represented as a spline to show how the signal may be interpolated in post-processing. Plot 550 illustrates that the temporal resolution is only limited by the sampling methods of the system, unlike with the discrete transmission delay.

FIG. 5C illustrates a depiction of the optic 400 of FIGS. 4A, 4B illustrating the continuous sample points created by the smooth optic 400.

Figure 6A:
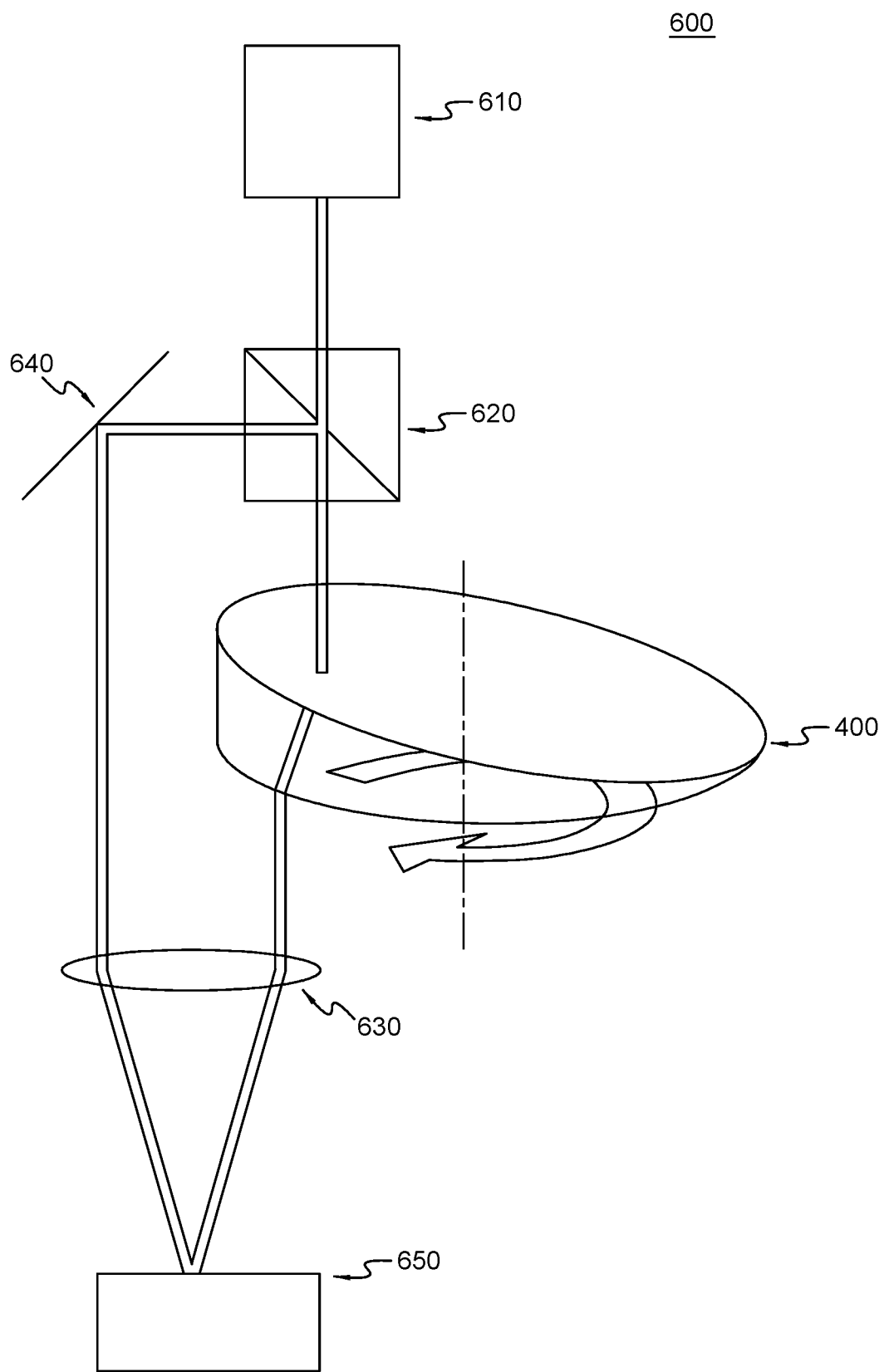
FIG. 6A illustrates a system utilizing the continuous transmission optical delay provided by the optic of FIGS. 4A, 4B.

FIG. 6A illustrates a system 600 utilizing the continuous transmission optical delay provided by the optic of FIGS. 4A, 4B. System 600 provides an example application of the discrete transmission optical delay. A single coherent light source 610 is split into two coherent beams via beamsplitter 620. One beam is focused through a lens 630 using a right-angle mirror 640 (to enable alignment) onto a detector 650. The other beam is first passed through the optic 400 providing the transmission optical delay and then focused through lens 630 onto a detector 650. Both beams may transmit through the lens 630 at the same point and may be incident on detector 650 also at the same location. The superposition of the two beams are spatially (and therefore temporally) convolved as the transmission optical delay rotates. The definition of optical delay is generalized as follows:

$$\tau_{delay} = z(\theta, \varphi, n_m) \frac{1}{c} \frac{n_m}{n_0},$$

where $\tau_{delay}$ is the optical delay in seconds, z is the thickness of optic 400 (medium) traveled by the light from light source 610 in meters, θ is the angle of rotation of optic 400 in degrees, c is the speed of light in meters per second, $n_m$ is the refractive index of optic 400 (medium), which is unitless, and $n_0$ is the refractive index outside optic 400 (medium), which is also unitless. Additional optical equipment (not shown), such as a converging lens, may be needed to mitigate the variation introduced by $r_{offset}$ described above.

Figure 6B:
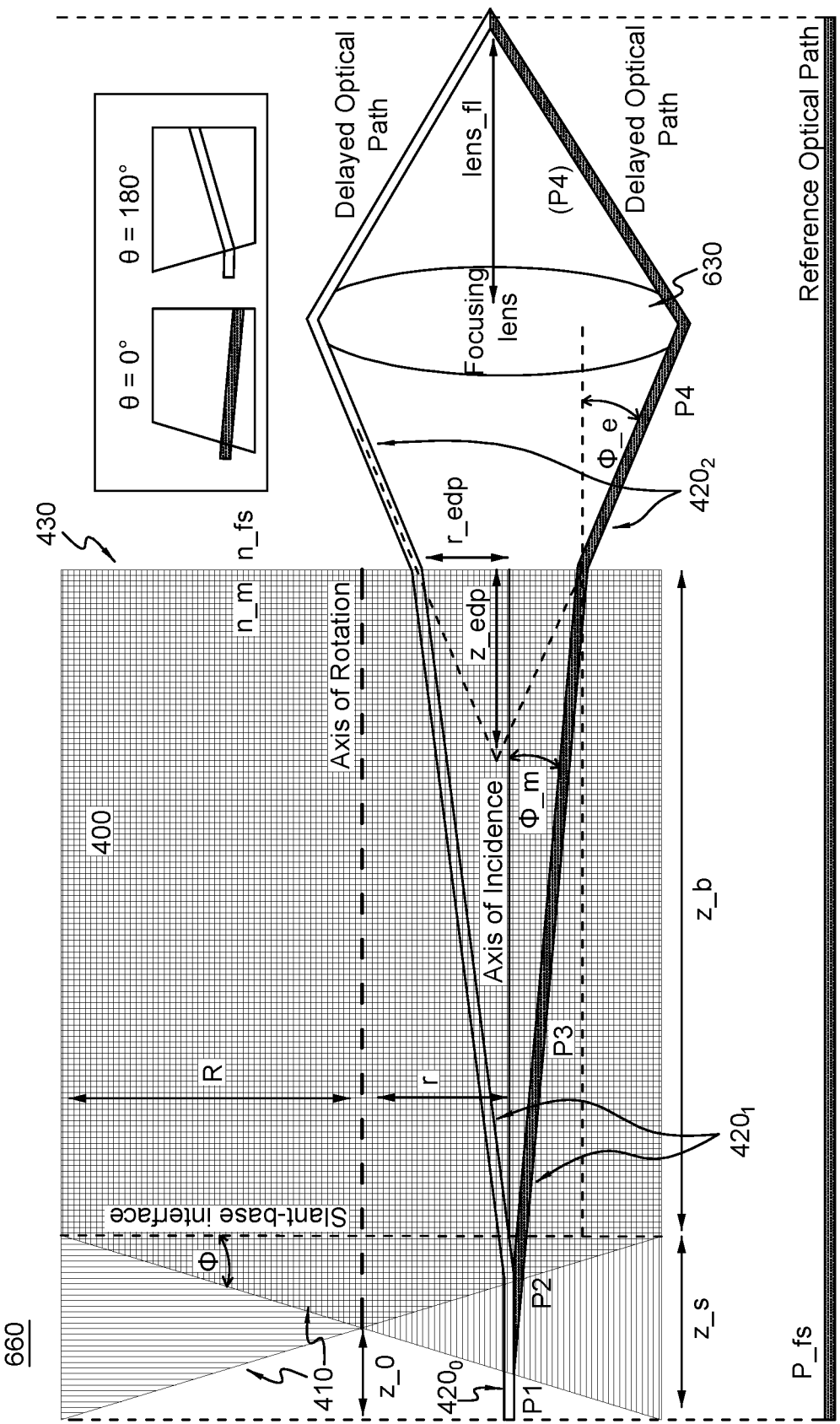
FIG. 6B illustrates a depiction of an optical ray trace of a portion of the system of FIG. 6A.

FIG. 6B illustrates a depiction of an optical ray trace 660 of a portion of the system 600 of FIG. 6A. Ray trace 660 depicts optic 400 and lens 630 and depicts a reference optical path and the delayed optical path. Optic 400 is depicted with the front surface 410 and the back surface 430. The wedge angle φ of optic 400 is shown. Phi (φ) is the wedge angle on the delay optic. Phi may have an upper limit that depends on the material, point of incidence, delay optic length, and the like. The ray trace 660 depicts a rotation angle θ from 0 degree to 180 degree and back to 360 degrees. Theta (θ) is the angle of rotation of optic 400. Theta may be 0-360 degrees. Focusing lens 630 is used to capture the light ray in the extreme traces in both 0-degree and 180-degree rotation angle for a given wedge angle.

When the light from light source interacts with the surfaces of optic 400, such as front surface 410 and back surface 430, the light may refract as discussed herein above. This refraction is depicted in FIG. 6B using an incident light beam 420₀ from light source 420. After interacting with front surface 410, incident light beam 420₀ refracts along a path defined by first refracted light beam 4201 which beam then refracts at back surface 430 along a path defined by second refracted light beam 4202. The beams, incident light beam 420₀ and second refracted light beam 4202 may be parallel and offset by a distance. Other optics in the system may be used to account for this beam displacement by distance.

FIG. 7A illustrates a system 700 utilizing the delay provided by the optic 100 of FIG. 1A or optic 400 of FIGS. 4A, 4B combined with an optical chopper 760 and rotated synchronously. System 700 provides an example application of the transmission optical delay (either discrete using optic 100 or continuous using optic 400) combined with an optical chopper and rotated synchronously. A single coherent light source 710 provides a single coherent output beam that is split into two coherent beams via beamsplitter 720. After the output beam is split into two coherent beams, with much less separation needed, allowing one of the beams to propagate through the optical chopper blades 760 and the other of the two beams to propagate through the transmission optical delay. One beam, after passing through chopper blades 760, is focused through a lens 730 using a right-angle mirror 740 onto a detector 750. The other beam is first passed through the optic 100, 400 providing the transmission optical delay and then focused through the lens 730 onto a detector 750. Both beams may propagate through the lens 730 at the same point and may be incident on detector 750 also at the same location. The superposition of the two beams are spatially (and therefore temporally) convolved as the transmission optical delay rotates.

Since the important signals in time-domain interferometry are often very small, phase sensitive detection via a phase sensitive detector 770 is used to recover the signal. Phase sensitive detection relies on a reference signal, often supplied by an optical chopper 760, which is modulating the optical input at the same frequency. Since the optical chopper 760 is already rotating in the system, if the transmissive optical delay optic 100, 400 is attached to the chopper 760, the experiment becomes much smaller and interferometry experiments may be made compact for field operation.

Phase sensitive detector 770 may use a lock-in amplifier. A lock-in amplifier is a type of amplifier that can extract a signal with a known carrier wave (based on the optical chopper 760) from an extremely noisy environment. Depending on the dynamic reserve of the instrument, signals up to 1 million times smaller than noise components, potentially fairly close by in frequency, may be reliably detected. Traditional lock-in amplifiers use analog frequency mixers and RC filters for the demodulation and some other instruments have both steps implemented by fast digital signal processing, for example, on an FPGA. Sine and cosine demodulation are performed simultaneously, referred to as dual-phase demodulation. This dual-phase demodulation allows the extraction of the in-phase and the quadrature component that may be transferred into polar coordinates, i.e., amplitude and phase, or further processing as real and imaginary parts of a complex number (e.g., for complex FFT analysis).

FIG. 7B illustrates a view of the optic/chopper element used in system 700 of FIG. 7A. This element includes the optic, such as optic 100 from FIG. 1A or optic 400 from FIG. 4A, 4B, combined with the chopper 760. Chopper 760 may include an open section 7601, and a blocked section 7602 configured in an alternating pattern around the periphery of the optic. In the illustrated element the optical chopper 760 is arranged radially around the outer portion of the element radially encompassing the optic 100, 400. As would be understood, a configuration internal to the optic may be used in order to control the rotation of the element and to attach to phase sensitive detector 770.

Generally, optical chopper 760 is a device which periodically interrupts a light beam—using open section 7601 and blocked section 7602. Optical choppers may be variable frequency rotating disc choppers (illustrated), fixed frequency tuning fork choppers, and optical shutters. Optical chopper 760 operates in combination with the lock-in amplifier(s) of phase sensitive detector 770. The chopper 760 may be used to modulate the intensity of the light beam, and the lock-in amplifier of phase sensitive detector 770 is used to improve the signal-to-noise ratio. Optical chopper 760 may be designed with a stable rotating speed. Increased frequency of rotation of chopper 760 increases efficiency in cases where the 1/f noise is a problem to be overcome. As would be understood, the speed of rotation of chopper 760 and the number of slots or pairs of open section 7601 and a blocked section 7602 may be modified as would be understood by those possessing an ordinary skill in the art. As illustrated in FIG. 7B, the open section 7601 and a blocked section 7602 are similarly sized, although this configuration is just exemplary and such a configuration would not need to be maintained as would be understood by those possessing an ordinary skill in the pertinent arts.

As with the other systems, additional optics may be needed on the exit side of the rotating piece to compensate for unwanted geometric optic transformations induced by the rotating piece. For example, with the chopper, the exiting beam path may be an elliptical cone, which may be corrected to a circular cone with some beam forming optics, etc.

Figure 8:
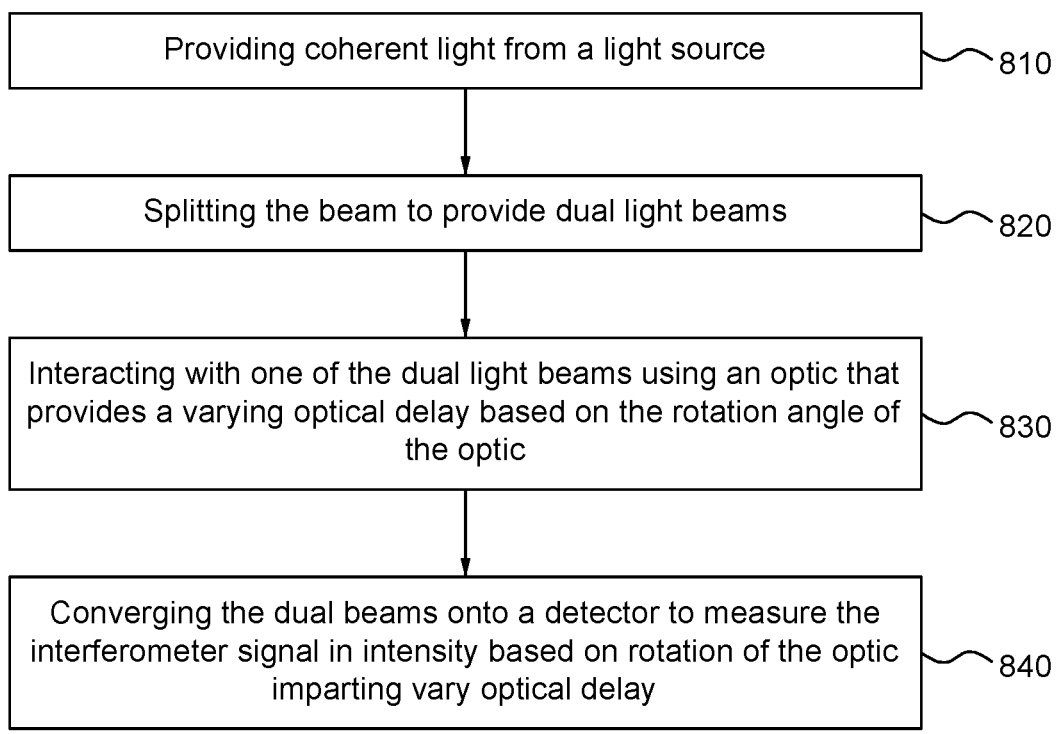
FIG. 8 illustrates a method performing optical delay using the optics of FIGS. 1A, 1B and 4A, 4B, 4C in systems of FIGS. 3, 6A, 6B and 7A.

FIG. 8 illustrates a method 800 performing optical delay using the optics of FIGS. 1A, 1B and 4A, 4B, 4C in systems of FIGS. 3, 6A, 6B and 7A. Method 800 includes the steps of providing coherent light from a light source at step 810. At step 820, method 800 includes splitting the beam to provide dual light beams. At step 830, method includes interacting with one of the dual light beams using an optic that provides a varying optical delay based on the rotation angle of the optic. At step 840, method 800 includes converging the dual beams onto a detector to measure the interferometer signal in intensity based on rotation of the optic imparting varying optical delay.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A device designed to impart a varying optical delay into an optical system based on rotation, the device comprising:
    a first surface configured to be aligned substantially perpendicular to a light beam in use, the first surface having a first surface center; and
    a second surface angularly offset with the first surface by an angle, $\varphi$, the second surface having a second surface center concentric with the first surface center and defining a center of the device,
    wherein the device is configured to accept a light beam outside the center of the device, and is configured to rotate in a rotation angle, $\Theta$, about the center in 360 degrees to create a continuously varying optical delay in a light beam where the continuous optical delay is defined by the rotation angle $\Theta$ and angular offset $\varphi$.

2. The device of claim 1, wherein the device comprises an index of refraction greater than 1.

3. The device of claim 1, wherein the device comprises a transmission of approximately 1.

4. The device of claim 1, wherein the device is continuous in forming the angular offset $\varphi$.

5. The device of claim 1, wherein the device is segmented in forming the angular offset $\varphi$.

6. The device of claim 5, wherein the number of segments is within a range from 4-12 segments.

7. The device of claim 1, wherein the angular offset $\varphi$ is between 5-50 degrees.

8. The device of claim 1, comprising at least one of borosilicate crown glass, UV fused silica, calcium fluoride, magnesium fluoride, zinc selenide, sapphire, barium fluoride, silicon, and germanium.

9. The device of claim 1, wherein at least one of the first surface and second surface includes an anti-reflection coating.

10. The device of claim 1, wherein the optical delay is a function of the thickness of the device interacting with the beam.

11. A system utilizing an optical delay, the system comprising:
    a light source producing a light output;
    a beamsplitter to split the light output from the light source into two light beams;
    an optical device designed to impart a varying optical delay into the system based on rotation of the optical device by interacting with a first of the two light beams, the optical device comprising:
        a first surface configured to be aligned substantially perpendicular to a light beam in use, the first surface having a first surface center; and
        a second surface angularly offset with the first surface by an angle, $\varphi$, the second surface having a second surface center concentric with the first surface center and defining a center of the device,
    wherein the device is configured to accept one of the two light beams outside the center of the device, and is configured to rotate in a rotation angle, $\Theta$, about the center in 360 degrees to create a continuously varying optical delay in one of the two light beams where the continuous optical delay is defined by the rotation angle $\Theta$ and angular offset $\varphi$, and
    an accumulator optic designed to direct the two light beams onto a detector.

12. The system of claim 11, further comprising an optic designed to capture the delayed light beam even as the light beam shifts as a result of the angle $\varphi$ causing the beam to refract.

13. The system of claim 11 further comprising at least one aligning mirror.

14. The system of claim 13 wherein the aligning mirror maintains alignment of the two light beams.

15. The system of claim 11, wherein the optical device is continuous in forming the angular offset $\varphi$.

16. The system of claim 11, wherein the optical device is segmented in forming the angular offset $\varphi$.

17. The system of claim 11, wherein the optical delay is a function of the thickness of the device interacting with the beam.

18. The system of claim 11, wherein the light source is coherent.

19. The system of claim 11, wherein the light source is infrared centered at one of 785 nm and 815 nm.

20. A method for performing optical delay using an optic, the method comprising:
    providing a coherent light beam from a light source;
    splitting the beam to provide dual light beams;
    interacting with one of the dual light beams using the optic rotatable in 360 degree that provides a continuously varying optical delay based on the rotation angle of the optic; and
    converging the dual beams onto a detector to measure an interferometric signal in intensity based on rotation of the optic imparting varied continuous optical delay.

* * * * *